US012665872B2

(12) United States Patent
Li et al.

(10) Patent No.: US 12,665,872 B2
(45) Date of Patent: Jun. 23, 2026

(54) VIRTUAL CONFERENCE MEETING SERVER COMPUTING USER RELEVANCE SCORES BASED ON CONTENT OF MEDIA STREAMS FROM AI AGENT MONITORED MEETINGS

(71) Applicant: Telefonaktiebolaget LM Ericsson (publ), Stockholm (SE)

(72) Inventors: Xiaoping Li, Karlskrona (SE); Gunilla Berndtsson, Nacka (SE); Jonas Lundberg, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 18/725,279

(22) PCT Filed: Dec. 30, 2021

(86) PCT No.: PCT/EP2021/087840

§ 371 (c)(1),
(2) Date: Jun. 28, 2024

(87) PCT Pub. No.: WO2023/126063

PCT Pub. Date: Jul. 6, 2023

(65) Prior Publication Data

US 2025/0071082 A1 Feb. 27, 2025

(51) Int. Cl.
H04L 51/226 (2022.01)
H04L 12/18 (2006.01)
H04L 51/18 (2022.01)
(52) U.S. Cl.
CPC ........ H04L 51/226 (2022.05); H04L 12/1827 (2013.01); H04L 51/18 (2013.01)

(58) Field of Classification Search
CPC ... H04L 51/226; H04L 12/1827; H04L 51/18; H04L 51/02; H04L 51/224
See application file for complete search history.

(56) References Cited

U.S. PATENT DOCUMENTS 10,511,643 B2    12/2019  Faulkner et al.
11,336,706 B1 *   5/2022  Saito .................. G06Q 10/1093
                          (Continued)

OTHER PUBLICATIONS

International Search Report and Written Opinion of the International Searching Authority, PCT/EP2021/087840, mailed Aug. 17, 2022, 12 pages.

*Primary Examiner* — Farzana B Huq
(74) *Attorney, Agent, or Firm* — Sage Patent Group

(57) ABSTRACT

A virtual conference meeting server includes at least one processor and at least one memory storing program code performing operations that include to assign an artificial intelligence (AI) meeting agent to analyze content of a media stream of a monitored meeting. The operation generate a meeting content relevance score based on the analysis by the AI meeting agent of the content of the media stream of the monitored meeting. When the meeting content relevance score satisfies a notification rule, the operations generate a meeting relevance notification to a device of a principal which is not presently joined in to receive the media stream of the monitored meeting. Responsive to an instruction received from the device of the principal or an automated switching rule, the operations switch the device of the principal from another concurrently occurring meeting to join the monitored meeting and receive the media stream of the monitored meeting.

17 Claims, 10 Drawing Sheets

(56)                    References Cited

U.S. PATENT DOCUMENTS

2018/0101823  A1        4/2018  Nelson et al.
2018/0337963  A1*    11/2018  Faulkner ............... H04L 65/403
2020/0226552  A1*      7/2020  Evans ...................... G08B 5/36
2021/0224753  A1        7/2021  Nasir
2021/0319408  A1      10/2021  Jorasch et al.
2021/0374683  A1*    12/2021  Park ...................... G06F 3/0482
2023/0030262  A1*      2/2023  Springer ............... H04L 67/535
2023/0036861  A1*      2/2023  Lum ........................ H04N 7/15

* cited by examiner

Calendar Before

| | | | |
|---|---|---|---|
| 9:00-10:00 | Meeting A | Meeting B | Meeting C |
| 10:00-12:00 | Meeting D | | Meeting E |
| 11:00-12:00 | Meeting F | Meeting G | Meeting H | Meeting I |

Calendar After

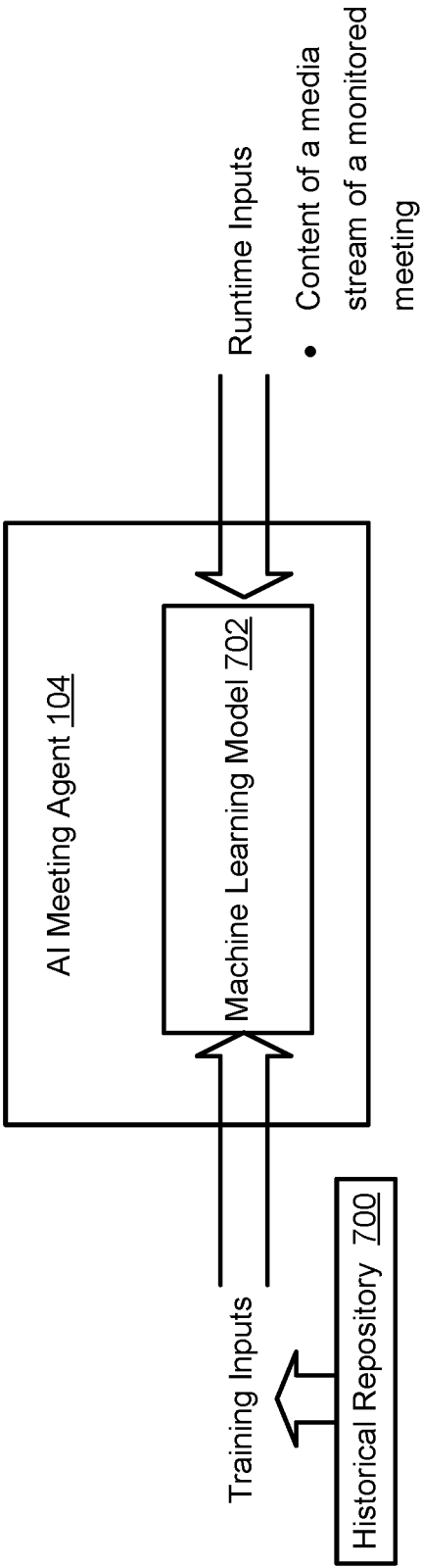

Runtime Inputs

- Content of a media stream of a monitored meeting
- List of participants
- Meeting recording status AI Meeting Agent 104

Machine Learning Model 702

Training Inputs

Historical Repository 700

- Content of media streams
- Lists of meeting participants
- Lists of roles of the meeting participants
- Content of emails related to the previous meetings
- Content of files related to the previous meetings
- Agendas of the previous meetings
- Content of earlier presentations by the principal
- Content of documents accessed during the previous meetings

FIGURE 7

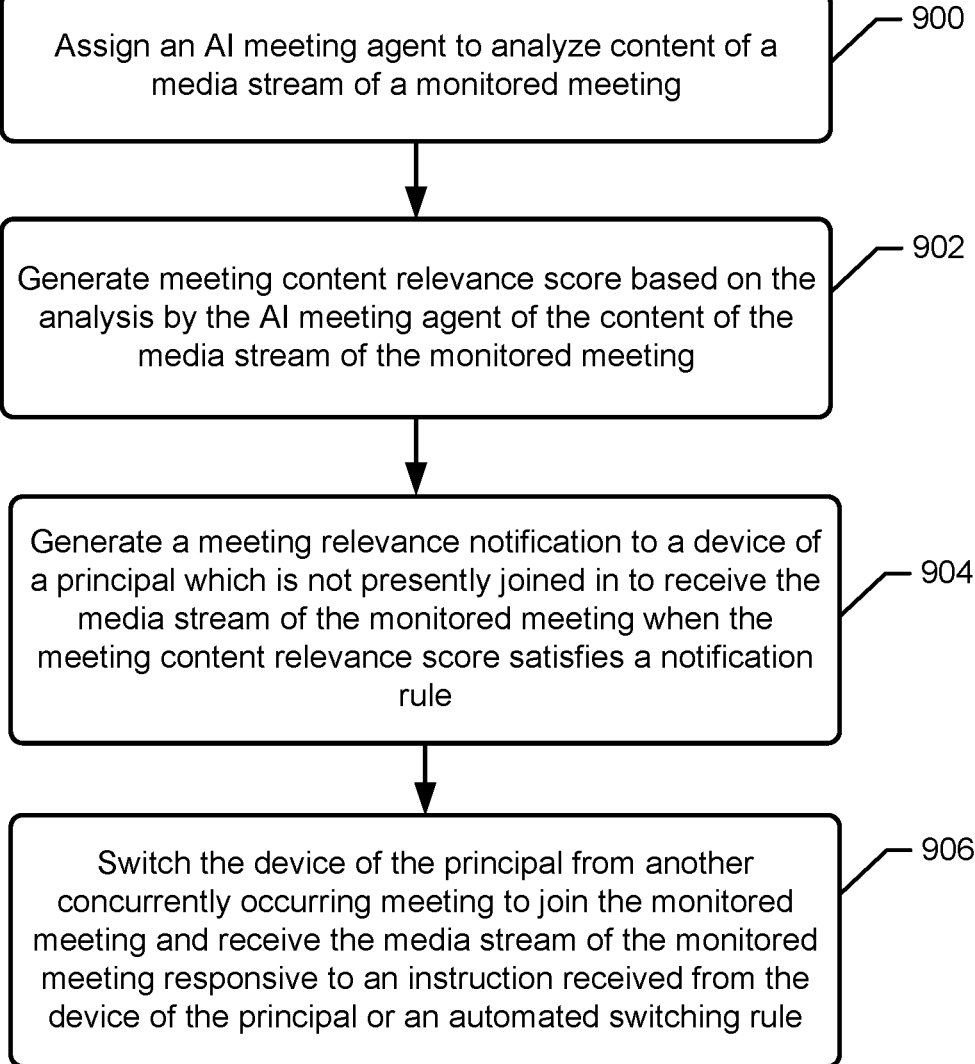

Assign an AI meeting agent to analyze content of a media stream of a monitored meeting — 900

Generate meeting content relevance score based on the analysis by the AI meeting agent of the content of the media stream of the monitored meeting — 902

Generate a meeting relevance notification to a device of a principal which is not presently joined in to receive the media stream of the monitored meeting when the meeting content relevance score satisfies a notification rule — 904

Switch the device of the principal from another concurrently occurring meeting to join the monitored meeting and receive the media stream of the monitored meeting responsive to an instruction received from the device of the principal or an automated switching rule — 906

FIGURE 9

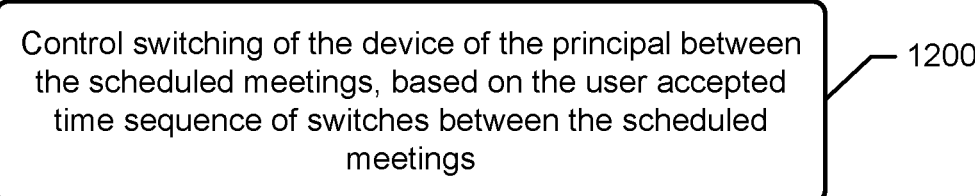

Control switching of the device of the principal between the scheduled meetings, based on the user accepted time sequence of switches between the scheduled meetings — 1200

FIGURE 12

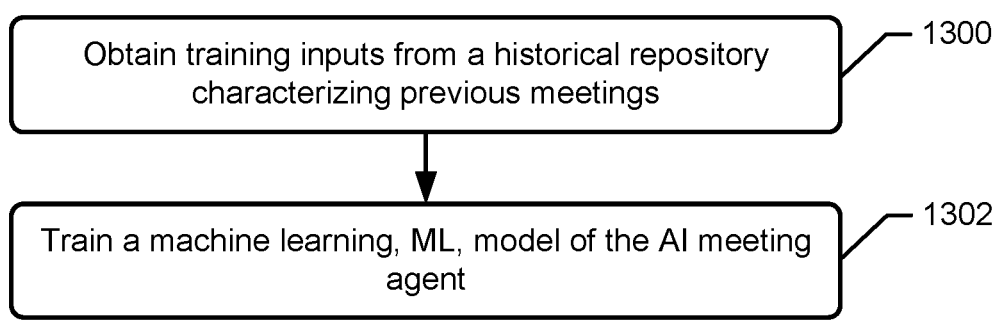

Obtain training inputs from a historical repository characterizing previous meetings — 1300

Train a machine learning, ML, model of the AI meeting agent — 1302

FIGURE 13

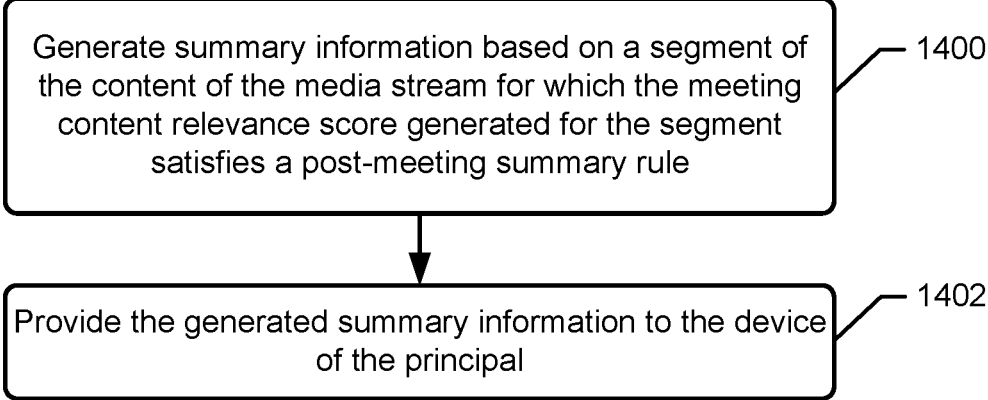

Generate summary information based on a segment of the content of the media stream for which the meeting content relevance score generated for the segment satisfies a post-meeting summary rule — 1400

Provide the generated summary information to the device of the principal — 1402

FIGURE 14

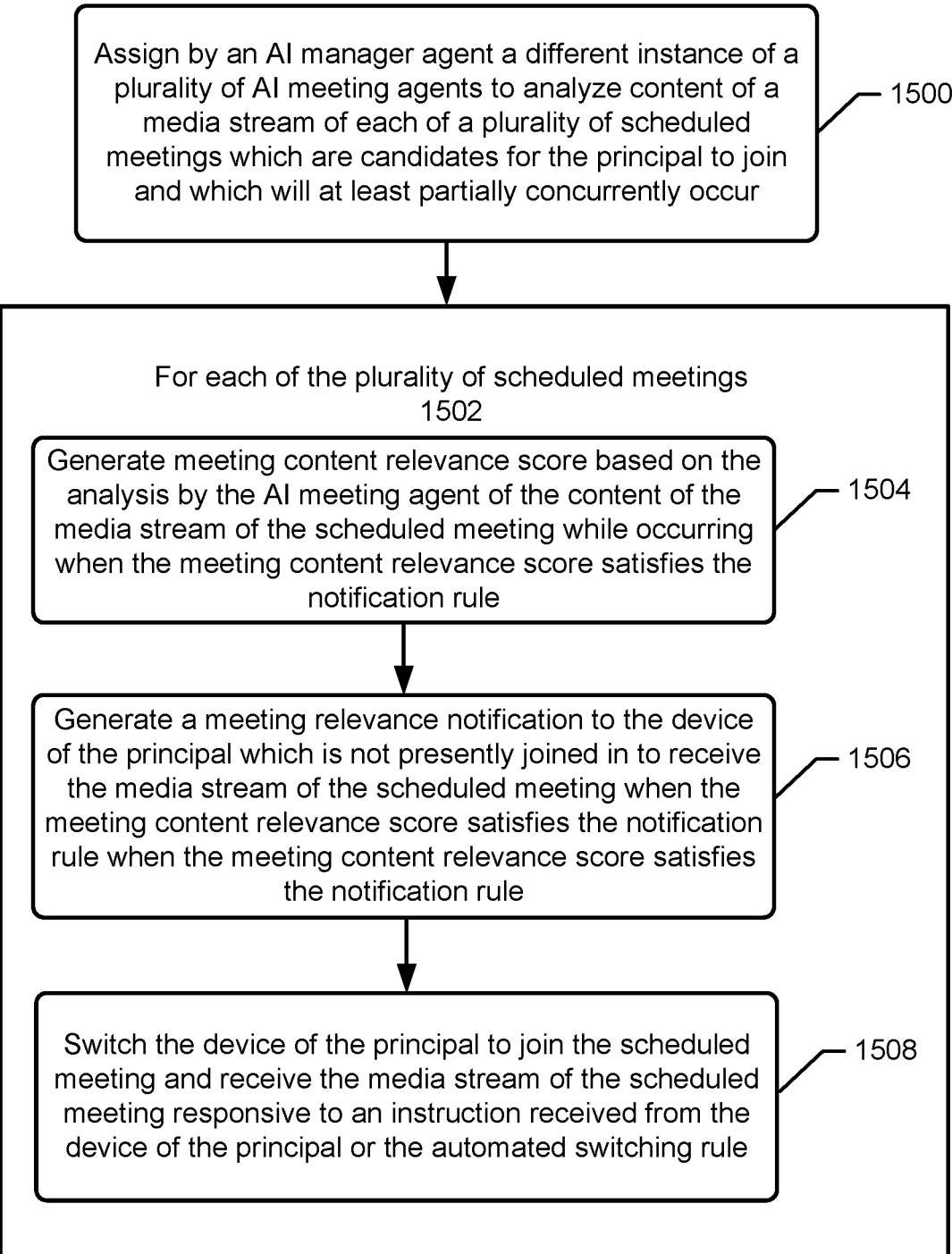

Assign by an AI manager agent a different instance of a plurality of AI meeting agents to analyze content of a media stream of each of a plurality of scheduled meetings which are candidates for the principal to join and which will at least partially concurrently occur — 1500

For each of the plurality of scheduled meetings 1502

Generate meeting content relevance score based on the analysis by the AI meeting agent of the content of the media stream of the scheduled meeting while occurring when the meeting content relevance score satisfies the notification rule — 1504

Generate a meeting relevance notification to the device of the principal which is not presently joined in to receive the media stream of the scheduled meeting when the meeting content relevance score satisfies the notification rule when the meeting content relevance score satisfies the notification rule — 1506

Switch the device of the principal to join the scheduled meeting and receive the media stream of the scheduled meeting responsive to an instruction received from the device of the principal or the automated switching rule — 1508

FIGURE 15

VIRTUAL CONFERENCE MEETING SERVER COMPUTING USER RELEVANCE SCORES BASED ON CONTENT OF MEDIA STREAMS FROM AI AGENT MONITORED MEETINGS

CROSS REFERENCE TO RELATED APPLICATIONS

This application is a 35 U.S.C. § 371 national stage application of PCT International Application No. PCT/EP2021/087840 filed on Dec. 30, 2021, the disclosure and content of which is incorporated by reference herein in its entirety.

TECHNICAL FIELD

The present disclosure relates to controlling communication sessions between virtual conference meeting servers and devices of participants joined in virtual meetings.

BACKGROUND

Virtual conferencing technology has matured and is now easy to access which enables distributed teams to collaborate effortlessly. This has facilitated communication as workplaces have shifting to having employees work remotely from home. The reduced occurrence of informal face-to-face meetings by working remotely has substantially increased the occurrence of more formally scheduled meetings. In one global survey the use of remote video conference has increased by almost 15 times since occurrence of the Covid-19 pandemic. Many people have busy work schedules and can receive multiple meeting invitations that unfortunately are scheduled to occur concurrently by at least partially overlapping in time. In this situation, a person can have a difficult choice as to which one of concurrent meetings should be scheduled for attending and added to a digital calendar.

Some meeting scheduling systems can indicate to a user when multiple meetings will conflict due to being scheduled to concurrently occur. The user may then electronically accept an invitation for one of the meetings and decline invitations for the other meetings, e.g., based on reading through all the invitations and deciding which one should be accepted. When conflicting meetings will occur in each of several different time slots within one day, the user then needs to spend extra time before those meetings to compare different options and make decisions for several times within a day.

SUMMARY

Some embodiments disclosed herein are directed to a virtual conference meeting server. The virtual conference meeting server includes at least one processor and at least one memory storing program code executable by at least one processor to perform operations. The operations include assigning an artificial intelligence (AI) meeting agent to analyze content of a media stream of a monitored meeting. The operations generate a meeting content relevance score based on the analysis by the AI meeting agent of the content of the media stream of the monitored meeting. When the meeting content relevance score satisfies a notification rule, the operations generate a meeting relevance notification to a device of a principal which is not presently joined in to receive the media stream of the monitored meeting. Responsive to an instruction received from the device of the principal or an automated switching rule, the operations switch the device of the principal from another concurrently occurring meeting to join the monitored meeting and receive the media stream of the monitored meeting.

Numerous potential advantages can be provided by these and further operations of the virtual conference meeting server which are disclosed herein. The virtual conference meeting server can operate so the principal has a virtual presence in a plurality of concurrently occurring (time overlapping) meetings and can notify the principal when any one of the meetings becomes sufficiently relevant to the principal such that the principal's device is to be switched to join that meeting. For example, the virtual conference meeting server can operate to assign AI meeting agents to monitor concurrently occurring meetings to determine when one of the meeting content relevance scores, which is generated based on the analysis by the respective AI meeting agent of the content of the media stream of the monitored meeting, satisfies the notification rule. The principal is then notified of the relevance of the monitored meeting, and the virtual conference meeting server can respond to an instruction from the principal or the automated switching rule, by switching the principal's device from another concurrently occurring meeting to join the monitored meeting and receive the media stream of the monitored meeting. The principal may thereby accept invitations to join time overlapping meetings and through operation of the AI meeting agents can effectively move between the meetings based on which meeting content is most relevant for the principal to participate in receiving and perhaps contributing.

Some other embodiments are directed to a method by a virtual conference meeting server. The method includes assigning an AI meeting agent to analyze content of a media stream of a monitored meeting. The method generates a meeting content relevance score based on the analysis by the AI meeting agent of the content of the media stream of the monitored meeting. When the meeting content relevance score satisfies a notification rule, the method generates a meeting relevance notification to a device of a principal which is not presently joined in to receive the media stream of the monitored meeting. Responsive to an instruction received from the device of the principal or an automated switching rule, the method switches the device of the principal from another concurrently occurring meeting to join the monitored meeting and receive the media stream of the monitored meeting.

Other virtual conference meeting server and methods according to embodiments will be or become apparent to one with skill in the art upon review of the following drawings and detailed description. It is intended that all such virtual conference meeting server and methods be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

Aspects of the present disclosure are illustrated by way of example and are not limited by the accompanying drawings. In the drawings:

FIG. 7 illustrates example training inputs used to train a machine learning model of the AI meeting agent and further illustrates runtime inputs which are processed by the machine learning model to generate meeting content relevance scores for a live monitored meeting in accordance with some embodiments of the present disclosure;

FIGS. 9 through 15 illustrate flowcharts of operations performed by the virtual conference meeting server in accordance with some embodiments of the present disclosure.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Figure 1:
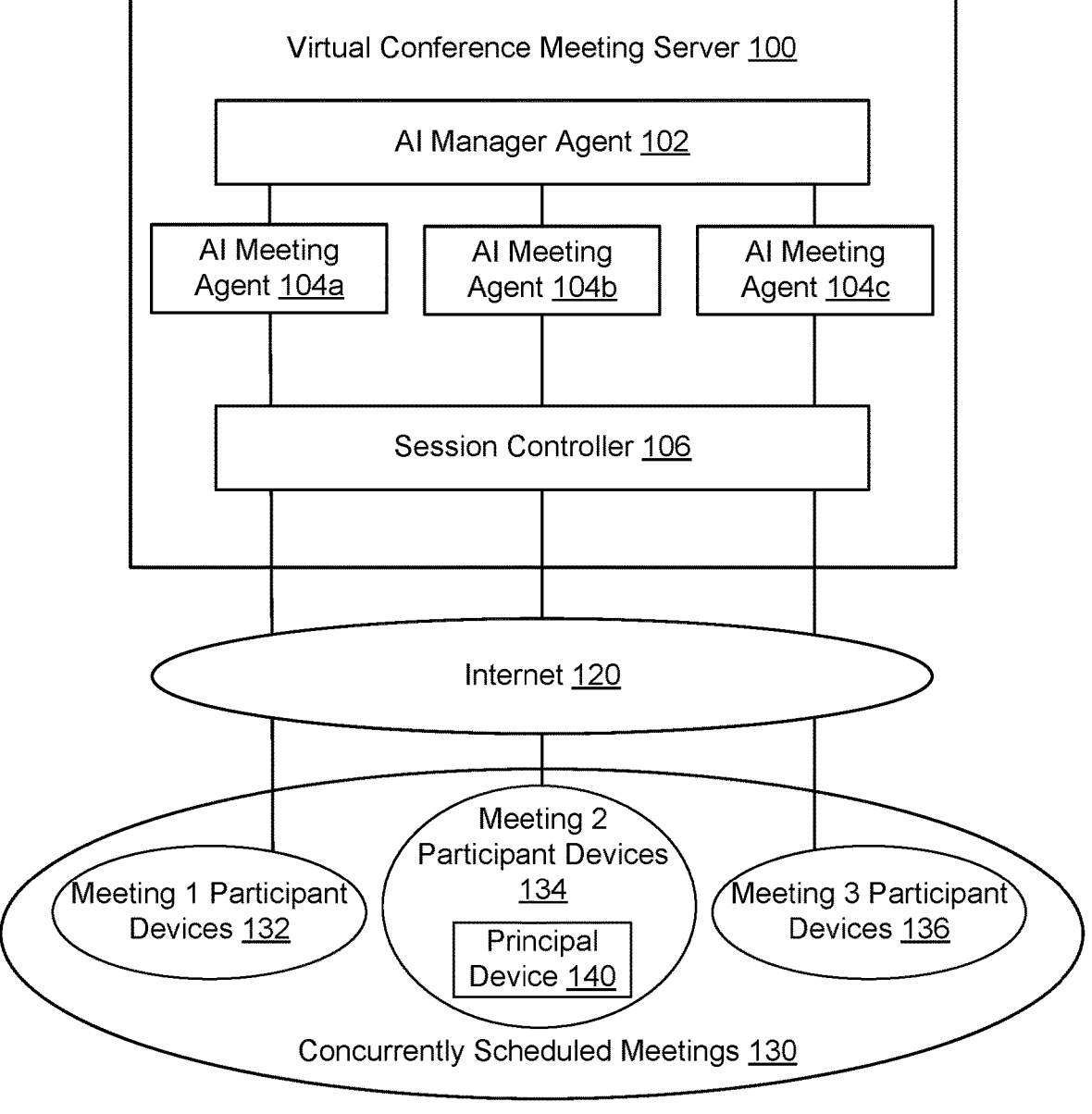
FIG. 1 illustrates a system having a virtual conference meeting server which generates meeting content relevance scores for meetings monitored by assigned AI meeting agents in accordance with some embodiments of the present disclosure.

FIG. 1 illustrates a system having a virtual conference meeting server 100 which generates meeting content relevance scores for meetings being monitored by assigned AI meeting agents 104a-104c in accordance with some embodiments of the present disclosure.

The virtual conference meeting server 100 communicates through one or more networks 120, e.g., public and/or private (Internet) networks, with a plurality of participant devices which are illustrated as being grouped into meetings 132, 134, 136 which are shown as a set of concurrently scheduled meetings 130. The virtual conference meeting server 100 can include an AI manager agent 102 which manages a plurality of AI meeting agents 104a-104c which it can assign to monitor content of ongoing concurrently scheduled meetings. The virtual conference meeting server 100 can also include a session controller 106 that can be configured to control routing of meeting content streams to various of the participant devices and perform switching of the devices from joining-in one meeting to another meeting by controlling the routing and combining of the content streams for the various meetings. The session controller 106 may use, for example, SIP and/or H.323 protocol to manage the communication sessions. The devices may include, without limitation, a personal computer, a laptop computer, a table computer, a smart phone, a wearable device such as a smart watch, a virtual reality (VR) headset, or an augmented reality (AR) headset.

A user may be invited to conflicting meetings which are scheduled to concurrently occur, such as the meetings 132, 134, and 136 illustrated in FIG. 1. Further complicating a user's decision as to which meeting should be attended is that the user may determine there are one or more particular segments of each meeting which are particularly relevant for the user to join to listen-to and/or discuss, and that the other parts of the meetings are not sufficiently relevant to the user. The user may therefore want to attend each of the concurrent meetings but only during the particular parts that are sufficiently relevant to the user.

Therefore, it would be very helpful for the user to be able to know which part of the meeting (e.g., segment or time slot) is sufficiently relevant to be scheduled for the user to join and to be made aware in near-real time when the relevant discussion in any of the concurrently occurring meetings is about to occur or has begun. In this manner, the user may initially join a first meeting for a limited time and then switch-over to join a second meeting, where the switching may be triggered by when a determination is made that sufficiently relevant content is about to be discussed or is being discussed in the second meeting. The user may thereby accept invitations for multiple concurrently scheduled meetings and effectively switch between the meetings to join discussions of content that is relevant to the user.

In various embodiments of the present disclosure, the user is referred to as a "principal" because artificial intelligence (AI) meeting agents are assigned to operate on behalf of the user, e.g., as "agents" of the "principal", to monitor content of the concurrent meetings so that the user may have a virtual presence in each of the concurrent meetings. Accordingly, the term "principal" can be interchangeably replaced with another term such as "user" or "person" without limitation. In FIG. 1, the device 140 is referred to as the "principal device" because it is used by the principal to participate in various of the meetings 132, 134, and 136 under control of the virtual conference meeting server 100.

The terms virtual and remote meetings can correspond to meetings via Teams, ZOOM and similar applications on personal computer, smart phones, etc., and moreover may correspond to meetings performed through VR platforms, AR platforms, and other smart or wearable devices. An AI meeting agent attending a meeting in place of the principal to analyze content of a media stream of the meeting may be graphically represented to other participants in the meeting as an icon, 2D graphical character, and/or a 3D avatar displayed in a VR or AR environment to represent a virtual presence of the principal in the meeting.

Example operations that may be performed during ongoing concurrent meetings will now be discussed.

FIG. 9 illustrates a flowchart of operations which may be performed by the virtual conference meeting server 100 during ongoing concurrently scheduled meetings in accordance with some embodiments of the present disclosure.

Referring to FIGS. 1 and 9, various embodiments of the present disclosure are directed to the virtual conference meeting server 100 which operates to assign 900 an AI meeting agent, such as one of the AI meeting agents 104a-104c (also referred to individually as 104 for brevity), to analyze content of a media stream of a monitored meeting. The AI manager agent 102 may be responsible for assigning a plurality of AI meeting agents 104 to monitor content of media streams of a corresponding plurality of concurrent meetings 130. For each of the AI meeting agents 104, the AI manager agent 102 may operate to generate 902 a meeting content relevance score based on the analysis by the AI meeting agent 104 of the content of the media stream of the monitored meeting. When the meeting content relevance score for one of the monitored meetings satisfies a notification rule, the AI manager agent 102 generates 904 a meeting relevance notification to the device 140 of the principal which is not presently joined in to receive the media stream of the monitored meeting. Responsive to an instruction received from the device 140 of the principal or an automated switching rule, the AI manager agent 102 may operate to switch the device 140 of the principal from another concurrently occurring meeting to join the monitored meeting and receive the media stream of the monitored meeting.

In other words, the AI meeting agent 104 may monitor an assigned-to meeting and determine whether content is being discussed which is relevant to the principal. If the AI meeting agent 104 determines sufficiently relevant content to the principal is being discussed in a meeting which the principal is not presently attending, it may inform the principal of that determination. The principal can then make an informed decision as to whether or when to switch between ongoing concurrent meetings.

If the principal has decided to switch from a first meeting to a second meeting, the AI meeting agent 104 can respond to that decision by controlling the session controller 106 to move the deice 140 of the principal between communication sessions to cease receiving the content stream of the first meeting and begin receiving the content stream of the second meeting.

Dynamic switching between meetings may occur and be adjusted in real-time responsive to the meeting content being monitoring by the AI meeting agent 104. When the meeting agenda is changed or the AI meeting agent 104 decides that some key stakeholders are absent from an ongoing meeting or a future scheduled meeting, the priority and relevance of the meeting or meeting section may be changed accordingly. The AI meeting agent 104 may make an updated meeting schedule proposal which can be shown to the principal in real-time.

Several AI meeting agents 104a-c may be managed and assigned by the AI manager agent 102 to attend different meetings on behalf of the principal according to, for example, their prior machine learning training which may be focused on particular types of meeting content, e.g., work project specific content.

During a live ongoing meeting, various types of meeting content that can be monitored and analyzed as inputs by the AI meeting agents 104a-c can include, but are not limited to, any one or more of the following:

an agenda for the monitored meeting, such as a voting session involving principal or a presentation by principal;

a video input media stream of a monitored meeting to perform operations such as a text recognition operation, object recognition operation, or meeting participant recognition;

an audio input media stream of a monitored meeting to perform operations such as a text recognition operation, a speech recognition operation, a person recognition operation;

a list of meeting participants in the monitored meeting;

roles and/or responsibilities of the meeting participants in the monitored meeting;

content of files shared with the principal and/or participants of the monitored meeting;

file metadata for files shared with the principal and/or participants of the monitored meeting;

an author of a document;

contributors to a document;

whether the monitored meeting is being recorded; and relatedness of meeting participants to the principal as determined by the AI meeting agent.

For example, FIG. 1 illustrates an example scenario in which the device 140 of the principal is presently joined in a meeting with the meeting 2 participant devices 134. The AI manager agent 102 has assigned AI meeting agent 104a to analyze content of a media stream of a first monitored meeting with Meeting 1 participant devices 132. The AI manager agent 102 has also assigned AI meeting agent 104b to analyze content of a media stream of the second monitored meeting with Meeting 2 participant devices 134. The AI manager agent 102 has also assigned AI meeting agent 104c to analyze content of the media stream of a third monitored meeting with Meeting 3 participant devices 136 over the network 120.

In the example of FIG. 1, if the AI meeting agent 104c generates 902 a meeting content relevance score for the Meeting 3 which satisfies a notification rule, a meeting relevance notification is generated 904 to the device 140 of the principal which is not presently joined in to receive the media stream of the Meeting 3. If the device 140 of the principal sends an instruction to switch or an automated switching rule is satisfied, the virtual conference meeting server 100 can control the session controller 106 to switch 906 the device 140 of the principal from the Meeting 2 to join the Meeting 3 and receive the media stream of the Meeting 3.

In another example, in an ongoing meeting, if a person who is supposed to speak at the beginning of the meeting is late, then the meeting content relevance score of the ongoing meeting will be changed also in real-time. This may trigger a notification to be generated to suggest the device of the principal switches to another ongoing meeting.

Various embodiments of the present disclosure allow one principal to follow several concurrent meetings and may provide the principal with proposals as to which meetings or meeting sections to attend. These embodiments may provide the principal with time savings and enable most effective utilization of the principal's time, and may prevent the principal from missing important decisions, information, or interactions occurring in various concurrently scheduled meetings. The virtual conference meeting server 100 may compare options dynamically as to which meetings or meeting segments the principal should attend based on changes in pre-meeting content and/or content of meeting streams. Although the virtual conference meeting server 100, e.g., the AI manager agent 102, may operate to make proposals, the principal may be provided full control as to which meeting is attended and timing for when switching between meetings is to occur. So if the principal doesn't want to follow what the virtual conference meeting server 100 proposes, the principal may change the plan and the AI manager agent 102 and AI meeting agents 104 can be controlled accordingly.

Numerous potential advantages may be provided by these and further operations of the virtual conference meeting server 100 which are disclosed herein. The virtual conference meeting server 100 may operate so the principal has a virtual presence in a plurality of concurrently occurring (time overlapping) meetings and may notify the principal when any one of the meetings becomes sufficiently relevant to the principal such that the principal's device 140 is to be switched to join that meeting. For example, the virtual conference meeting server 100 may operate to assign AI meeting agents 104 to monitor concurrently occurring meetings to determine when one of the meeting content relevance scores, which is generated based on the analysis by the respective AI meeting agent 104 of the content of the media stream of the monitored meeting, satisfies the notification rule. The principal is then notified of the relevance of the monitored meeting, and the virtual conference meeting server 100 may respond to an instruction from the principal or the automated switching rule, by switching the principal's device 140 from another concurrently occurring meeting to join the monitored and receive the media stream of the monitored meeting. The principal may thereby accept invitations to join time overlapping meetings and through operation of the AI meeting agents may effectively move between the meetings based on which meeting content is most relevant for the principal to participate in receiving and perhaps contributing.

In some embodiments, if there will be a voting session or there is a question addressed to the principal during a meeting which the AI meeting agent 104 attends for the principal, the AI meeting agent 104 can operate to indicate that the principal is needed in that meeting in real time, and may provide the principal with certain background information such as a summary of the current topics that have been discussed and/or are being discussed in the meeting.

The virtual conference meeting server 100 may generate information (e.g., markup a document or presentation) regarding relevant content of another meeting, not being attended by the principal, for the principal to review before being switched to that other meeting. The virtual conference meeting server 100 may also or alternatively generate information while the principal is absent from an ongoing meeting, e.g., while attending a segment of another meeting. Such information may be included in a calendar entry for the principal. The virtual conference meeting server 100 may propose that this information, e.g., document, is to be reviewed at a defined time before the principal joins the other meeting to be quickly updated on the missed content that was relevant for the principal to know.

Figure 10:
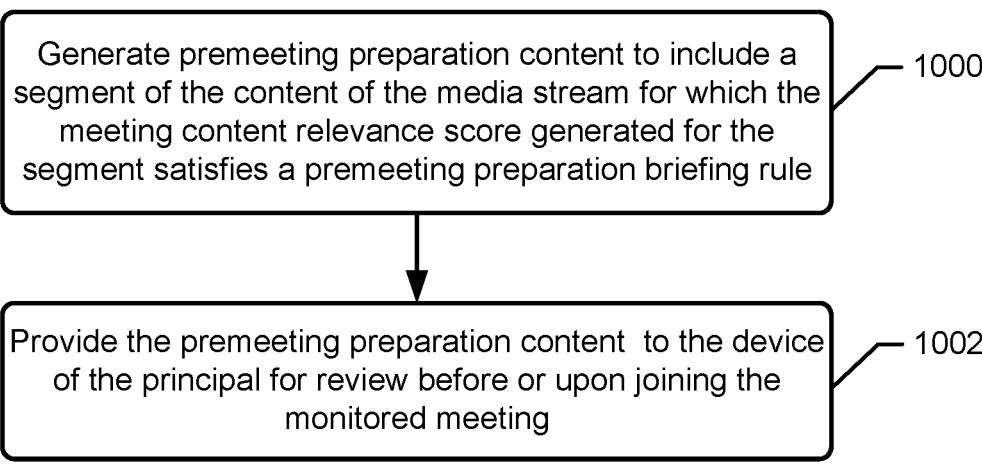

FIG. 10 illustrates a flowchart of operations performed by the virtual conference meeting server during ongoing concurrently scheduled meetings in accordance with some embodiments of the present disclosure.

In some embodiments, the virtual conference meeting server 100 further operates to generate 1000 premeeting preparation content to include a segment of the content of the media stream for which the meeting content relevance score generated for the segment satisfies a premeeting preparation briefing rule. The virtual conference meeting server 100 also further operates to provide 1002 the premeeting preparation content to the device 140 of the principal for review before or upon joining the monitored meeting.

In some of these embodiments, the operations to generate 1000 the premeeting preparation content includes identifying a question that is directed to the principal in the segment of the content of the media stream and generate the premeeting preparation content to include the segment of the content of the media stream that contains the question directed to the principal.

In other embodiments, the operations to generate 1000 the premeeting preparation content includes identifying one of a topic relevant to the principal or the principal's name Even if a meeting participant does not mention the principal, any relevant topics or question related to the principal can be identified by the virtual conference server 100 and used to inform the principal by providing premeeting preparations or notes before the principal joins the meeting. For instance, if the principal is scheduled to join a draft review meeting with other participants, and the principal and/or the other participant(s) have previously sent draft document(s) to the other participant in the past, the virtual conference server 100 may generate the meeting content relevance scores based, at least in-part, on content of the draft document(s) to indicate which meeting is most relevant to be attended by which participants. Therefore, before the meeting the virtual conference server 100 may include the related document(s) as an attachment to a meeting invitation and/or may add to the principal's electronic calendar event. Then, before the meeting starts, the virtual conference server 100 may operate to automatically open the document for the principal, so the principal is made aware and without spending time looking for the document (s) file(s).

In some embodiments, the operations to generate 902 the meeting content relevance score based on the analysis by the AI meeting agent 104 of the content of the media stream of the monitored meeting includes at least one of: identifying through the analysis of the content of the media stream progress of the monitored meeting relative to a meeting agenda for the monitored meeting; identifying through the analysis of the content of the media stream at least one reference to the principal or an item associated with the principal; and identifying a level of similarity between the content of the media stream of the monitored meeting and training inputs which were used to train the AI meeting agent 104.

Various operations are now explained which may be performed by the virtual conference meeting server 100 before the start of various concurrently scheduled meetings.

Figure 11:
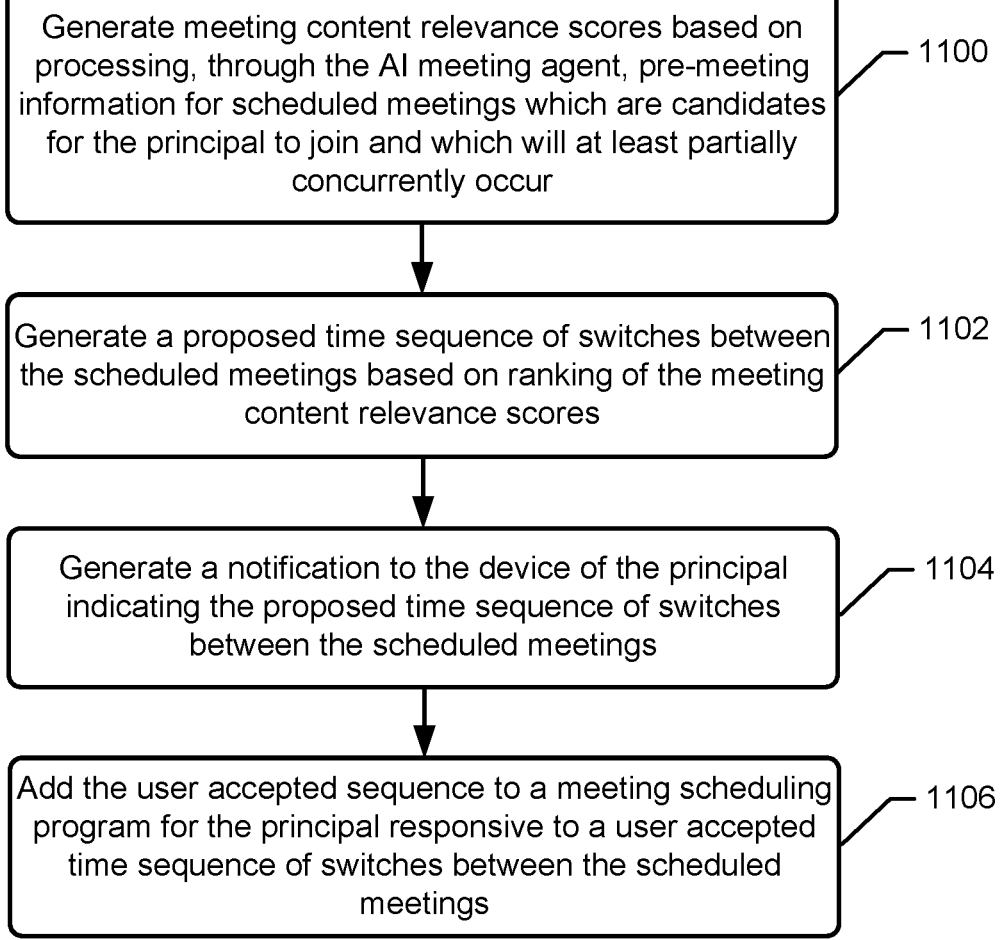

FIGS. 11 and 12 illustrate flowcharts of operations performed by the virtual conference meeting server before concurrently scheduled meetings in accordance with some embodiments of the present disclosure.

Referring initially to FIGS. 1 and 11, in some embodiments, the virtual conference meeting server 100 further operates to generate 1100 meeting content relevance scores based on processing, e.g., through the AI meeting agent 104, pre-meeting information for scheduled meetings which are candidates for the principal to join and which will at least partially concurrently occur. The virtual conference meeting server 100 also further operates, e.g., via the AI manager agent 102, to generate 1102 a proposed time sequence of switches between the scheduled meetings based on ranking of the meeting content relevance scores. The virtual conference meeting server 100 also further operates to generate

1104 a notification to the device 140 of the principal indicating the proposed time sequence of switches between the scheduled meetings. The virtual conference meeting server 100 also further operates to add 1106 the principal accepted time sequence to a meeting scheduling program for the principal responsive to a principal accepted time sequence of switches between the scheduled meetings.

Referring now to FIGS. 1 and 12, in some embodiments, the virtual conference meeting server 100 further operates to control 1200 switching of the device 140 of the principal between the scheduled meetings, based on the principal accepted time sequence of switches between the scheduled meetings.

In some embodiments, the pre-meeting information for scheduled meetings include at least one of: agendas for the scheduled meetings; lists of meeting participants for the scheduled meetings; lists of roles of the meeting participants for the scheduled meetings; content of a file that has been shared with the principal related to one of the scheduled meetings; metadata of the file shared with the principal; and content of social media account associated with the principal.

Thus, after meeting invites are received, the AI manager agent 102 may help to compare those concurrently scheduled meetings and propose to the principal which of the concurrently scheduled meetings or parts of the concurrently scheduled meetings are more important and relevant for the principal. For example, these operations may be performed based on content of emails the principal has received related to the meetings, content of the agendas for the meetings, and/or content of other documents the principal has received related to the meetings.

Various operations are now explained which may be performed to train the virtual conference meeting server 100 and, more particularly, the AI meeting agents 104.

Figure 6:
FIG. 6 illustrates a block diagram of an AI meeting agent which monitors a media stream of a meeting and outputs a meeting content relevance score to an AI manager agent in accordance with some embodiments of the present disclosure.

FIG. 6 illustrates a block diagram of the AI meeting agent 104 which monitors a media stream of a meeting and outputs a meeting content relevance score to the AI manager agent 102 in accordance with some embodiments of the present disclosure. The AI manager agent 102 may operate to assign individual ones of the AI meeting agents 104 to different scheduled concurrent meetings to provide the principal a virtual presence in those meetings and enable the principal to be informed of which segments of which meetings are recommended to be attended and/or to inform the principal when content of one meeting has become sufficient relevant, based on relevance score outputs of the AI meeting agents 104, such that switching between meetings is recommended.

The AI meeting agent 104 can be trained based on historical data related to meetings and through the learned knowledge of what content is relevant to the principal, can enable it to, for example, propose an entire day's meeting plan to the principal. The AI manager agent 102 may generate an initial proposed schedule of which sections of which meetings the principal should plan to attend based on, e.g., agendas provided with meeting invitations and other information associated with the meetings.

The meeting sections which the AI manager agent 102 proposes the principal to attend may be illustrated with a highlighting in a specific color on the principal's electronic calendar. For the other meeting sections that are less interactive and less relevant, the AI manager agent 102 may assign corresponding AI meeting agents 104a-c to attend those meetings to analyze the content of those meetings to make recommendations to the principal, such as based on determining the progress of the meetings relative to the meetings' agendas and/or content over meetings' presentations.

FIG. 7 illustrates example training inputs used to train a machine learning (ML) model 702 of an AI meeting agent 104 and further illustrates runtime inputs which are processed by the machine learning model 702 to generate meeting content relevance scores for a live monitored meeting. FIG. 13 illustrates a flowchart of operations performed by the virtual conference meeting server 100 during training operations in accordance with some embodiments of the present disclosure.

Referring to FIGS. 7 and 13, in some embodiments, the virtual conference meeting server 100 further operates to obtain 1300 training inputs from a historical repository 700 characterizing previous meetings. The virtual conference meeting server 100 also further operates to train 1302 the ML model 702 of the AI meeting agent 104. The generation 902 of the meeting content relevance score can include processing the media stream of the monitored meeting through the ML model 702.

In some embodiments, the training inputs obtained from the historical repository 700 include at least one of:

content of media streams of previous meetings attended by the principal;

lists of meeting participants of the previous meetings attended by the principal or the future meetings scheduled for the principal;

lists of roles of the meeting participants of the previous meetings attended by the principal or the future meetings scheduled for the principal, e.g., whether principal was designated as optional or required participant of the meetings, organizer of the meetings, presenter of the meetings, etc.;

content of emails sent by or received by the principal related to the previous meetings attended by the principal or the future meetings scheduled for the principal;

content of group messaging sent by or received by the principal related to the previous meetings attended by the principal or the future meetings scheduled for the principal;

content of files sent by or received by the principal related to the previous meetings attended by the principal or the future meetings scheduled for the principal;

agendas of the previous meetings attended by the principal or the future meetings scheduled for the principal;

whether the previous meetings were recorded;

whether the future meetings scheduled will be recorded;

content of earlier presentations by the principal at the previous meetings attended by the principal;

content of documents accessed by the principal during the previous meetings attended by the principal; and content of social media account(s) associated with the principal, e.g., keywords present in content of principal's LinkedIn account.

The relevance of a meeting or the content of the meeting can be determined, as a meeting content relevance score, based on content (information or illustrative types of data) related to not only the principal's previous meetings, but also based on content related to the principal's future scheduled meetings. For example, the principal receives an invitation to an international conference requesting that the principal have a presenter role to make a presentation in the beginning of the next year for 1000 people. Since the principal will have a presenter role for the future meeting, information or illustrative types of data related to the future event is also relevant to determining recommendations for attendance of the principal in other scheduled meetings or segments of such meetings occurring before the international conference.

Various operations are now explained which may be performed by the virtual conference meeting server 100 after completion of various concurrently scheduled meetings.

In some embodiments, various illustrative types of data for previous concurrently scheduled meetings are stored into the historical repository 700 for use in further training of the machine learning model 702.

Referring to FIG. 7, in some embodiments, the virtual conference meeting server 100 further operates to generate new training inputs by the AI meeting agent 104 analyzing the content of the media stream of the monitored meeting. The new training inputs may include at least one of:

a segment of the content of the media stream of the monitored meeting for which the meeting relevance score generated for the segment of the content satisfies a training rule;

a list of meeting participants of the monitored meeting when joined by the principal;

a list of roles of the meeting participants of the monitored meeting when joined by the principal;

content of emails sent by or received by the principal related to the monitored meeting;

content of files sent by or received by the principal related to the monitored meeting;

whether the monitored meeting was recorded;

whether instructions were received from the device of the principal to switch the device of the principal from another concurrently occurring meeting to join the monitored meeting after a meeting relevance notification was generated (e.g., train based on whether principal accepted prior notified recommendations for switching between meetings);

an agenda item of the monitored meeting that was discussed while the principal was present in the monitored meeting;

an agenda item of the monitored meeting that was discussed before the principal joined the monitored meeting;

an agenda item of the monitored meeting that was discussed after the principal left the monitored meeting;

content of a presentation of the monitored meeting before the principal joined the monitored meeting;

content of a presentation of the monitored meeting after the principal left the monitored meeting;

content of a presentation by the principal while joined in the monitored meeting; and content of documents accessed by the principal while joined in the monitored meeting.

The virtual conference meeting server 100 may further operate to update the historical repository 700 based on content of the new training inputs.

In some embodiments, the virtual conference meeting server 100 generates post-meeting summary documents.

FIG. 14 illustrates a flowchart of operations performed by the virtual conference meeting server after completion of various concurrently scheduled meetings in accordance with some embodiments of the present disclosure.

Referring to FIG. 14, in some embodiments, the virtual conference meeting server 100 further operates to generate 1400 summary information based on a segment of the content of the media stream for which the meeting content relevance score generated for the segment satisfies a post-meeting summary rule. The virtual conference meeting server 100 also further operates to provide 1402 the generated summary information to the device of the principal.

Various operations are now explained which may be performed by the virtual conference meeting server 100 and, more particularly, by the AI manager agent 102 to assign AI meeting agents 104 to monitor content of meetings that at least partially concurrently occur.

FIG. 15 illustrates a flowchart of operations performed by the virtual conference meeting server in accordance with some embodiments of the present disclosure.

Referring to FIGS. 1 and 15, in some embodiments, the virtual conference meeting server 100 further operates to assign 1500 by the AI manager agent 102 a different instance of a plurality of AI meeting agents 104 to analyze content of a media stream of each of a plurality of scheduled meetings 130 which are candidates for the principal to join and which will at least partially concurrently occur. The virtual conference meeting server 100 also performs further operations 1502 for each of the plurality of scheduled meetings 130. The virtual conference meeting server 100 generates 1504 the meeting content relevance score based on the analysis by the AI meeting agent 104 of the content of the media stream of the scheduled meeting while occurring for each of the plurality of scheduled meetings 130. The virtual conference meeting server 100 also generates 1506 a meeting relevance notification to the device 140 of the principal which is not presently joined in to receive the media stream of the scheduled meeting for each of the plurality of scheduled meetings 130 when the meeting content relevance score satisfies the notification rule. The virtual conference meeting server 100 also switches 1508 the device 140 of the principal to join the scheduled meeting and receive the media stream of the scheduled meeting responsive to an instruction received from the device 140 of the principal or the automated switching rule for each of the plurality of scheduled meetings 130. In some embodiments, the virtual conference meeting server 100 only performs switching of the principal between meetings responsive to receiving an acceptance of switching from the principal, while in some other embodiments the virtual conference meeting server 100 can perform switching of the principal between meetings without requiring receipt of any acceptance of switching from the principal.

In some embodiments, the notification rule includes identifying when the meeting content relevance score for one of the scheduled meetings exceeds another meeting content relevance score for another one of the scheduled meetings to which the device 140 of the principal is currently joined.

In one embodiment, the meeting content relevance scores of multiple meetings are compared and the virtual conference meeting server 100 can adjust a proposed meeting schedule for when the principal should switch between attending different ones of the concurrent meetings. The virtual conference meeting server 100 may trigger a notification to the principal when the meeting content relevance score of one meeting becomes sufficiently higher than another meeting which the principal is presently attending so that the principal may initiate or otherwise allow switching to the more relevant meeting.

Various further implementation related operations are now explained which may be performed by the virtual conference meeting server 100.

Figure 2:
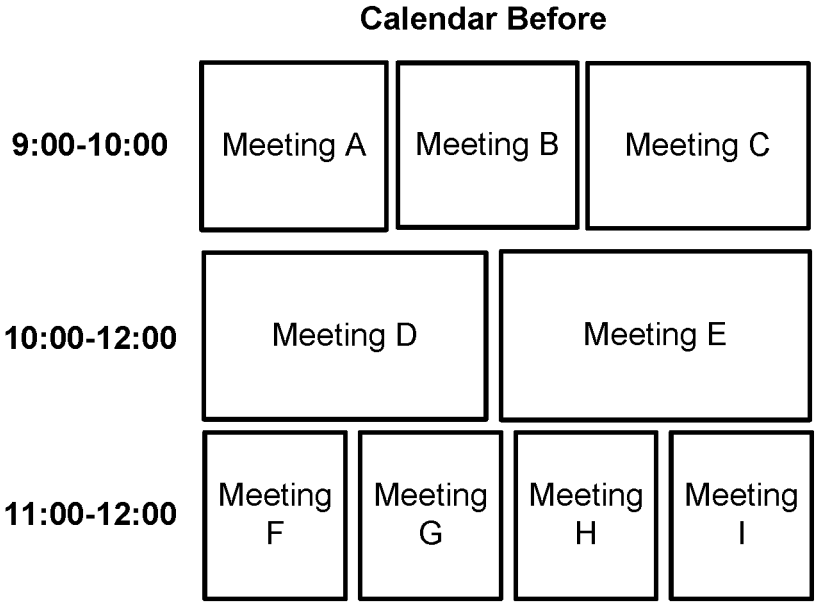
FIG. 2 illustrates the principal's calendar of scheduled meetings which include concurrent meetings which are to be monitored by AI meeting agents in accordance with some embodiments of the present disclosure.
Figure 3:
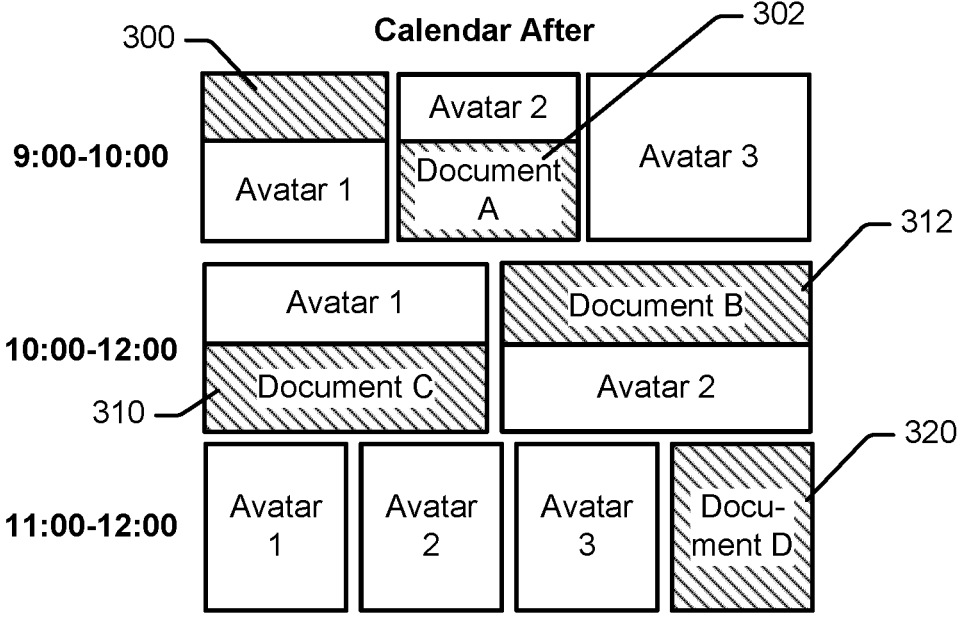
FIG. 3 illustrates a time sequence for which the principal is proposed to switch between various of the concurrent meetings based on pre-meeting analysis by the virtual conference meeting server in accordance with some embodiments of the present disclosure.

FIG. 2 is an example illustration of the principal's calendar of scheduled meetings which include concurrent meetings which are to be monitored by AI meeting agents. FIG. 3 is an example illustration of a time sequence for which the principal is proposed to switch between various of the concurrent meetings based on pre-meeting analysis by the virtual conference meeting server.

In one example, the virtual conference meeting server 100 obtains input from the current electronic calendar or schedule, shown on FIG. 2, of the principal. In the illustrated example there are 3 concurrently scheduled meetings from 9:00 to 10:00, then 2 concurrently scheduled meetings from 10:00 to 11:00, and then 4 concurrently scheduled meetings from 11:00 to 12:00. The AI manager agent 102 analyzes relevance of content to the principal for sections of the concurrent meetings, and can operate to define time-based split sections of the meetings with associated indications of the determined relevance of the sections to the principal. In the example of FIG. 2, the AI manager agent 102 may indicate which sections of which meetings are most relevant to the principal through use of colors, highlighting, shading, textures, graphical shapes, etc. In the illustrated example, the virtual conference meeting server 100 (e.g., AI manager agent 102) proposes the principal to participate the first half segment 300 of meeting A, then switch to the last half segment 302 of meeting B, then switch to the first half segment 312 of meeting E, then to the last half segment 310 of meeting D, and finally attend the entire segment 320 of meeting I.

Although FIG. 3 only shows a proposal for half a day as an example, the virtual conference meeting server 100 may provide a holistic plan or proposal for an entire day, entire week or similar, which is adapted to dynamic changes.

Those various recommended meeting segments are determined based on them having a highest meeting content relevance score at the corresponding instants in time and therefore are considered most relevant and important for the principal to listen to, give feedback on, and/or other provide interaction regarding. While for the other meetings and/or meeting segments that the principal cannot attend, different AI meeting agents 104 can be assigned to attend to represent the principal and monitor content thereof. If in a particular meeting a person or a topic is mentioned related to the principal, while the principal is attending another meeting, the AI meeting agent 104 for the particular meeting may operate to alert the principal that he or she may be needed and invite or other assist the principal with joining the particular meeting. The virtual conference meeting server 100 may provide background information regarding content relevant to the particular meeting to the principal for review before or after joining the particular meeting. As explained above, the background information may include, for example, questions which have been raised that mentioned the principal's name, discussion and/or parts of documents that contain keywords which have been determined to be relevant to the principal, etc.

When the principal has be switched to the particular meeting, another AI meeting agent 104 may operate to monitor content of the other meeting that was left. All the AI meeting agents 104 may have different expertise due to different training based on different training inputs, differences in content of the different meetings individual ones of the AI meeting agents 104 have attended before, and differences in content of pre-meeting and during-meeting documents, etc., that individual ones of the AI meeting agents 104 have analyzed relating to different assigned meetings. The AI manager agent 102 may assign a most suitable one of the AI meeting agents 104 to each of the concurrent meetings according to associated expertise and training of the individual AI meeting agents 104.

The proposed schedule may be manually overridden at any time by the principal, and the AI meeting agent 104 will then be re-scheduled to the meeting that the principal is not going to participating in.

Another alternative solution is that no matter if a principal attends a meeting or not, there will always be an AI meeting agent 104 to attend and monitor all the principal's meetings. When a principal is in a meeting or not, the AI meeting agent 104 may help to take notes or make an abstract or summary of the meeting, monitor the status, etc.

As shown some sections of the meetings illustrated in FIG. 2, the AI manager agent 102 can analyze content of meeting related documents such as PowerPoint presentations, email, agendas, etc., to determine relevance score for the meetings and may generate the background information for review by the principal based on thereon. For example, when the principal is attending meeting A, a related document about meeting A may be opened by the AI manager agent 102 for review. When the principal shifts to meeting B, the AI meeting agent 104 may show the principal documents or meeting minutes related to meeting B.

Figure 4:
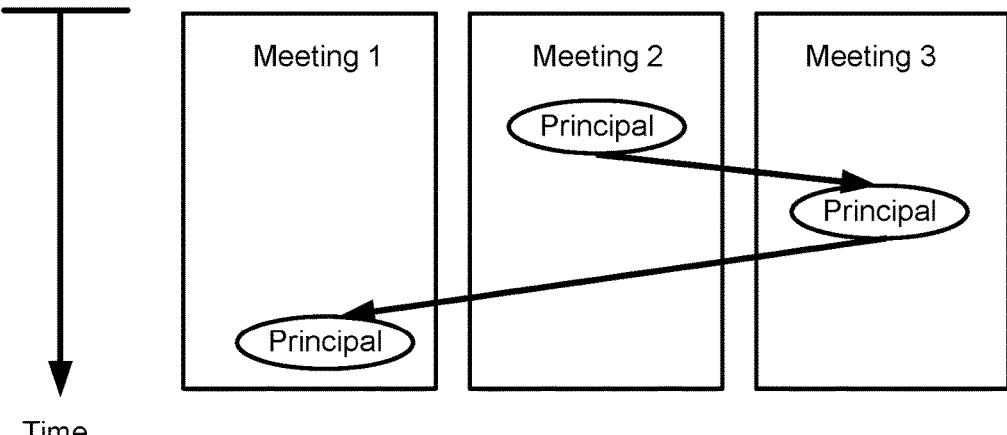
FIG. 4 illustrates an example order in which the principal joins the second meeting and is later switched to the third meeting and then the first meeting based on the respective meeting relevance scores determined by the virtual conference meeting server based on the AI meeting agents monitoring content of the ongoing concurrent meetings in accordance with some embodiments of the present disclosure.

FIG. 4 illustrates another example order in which the principal joins the second meeting and is later switched to the third meeting and then to the first meeting based on the respective meeting relevance scores determined by the virtual conference meeting server based on the AI meeting agents monitoring content of the ongoing concurrent meetings.

Figure 5:
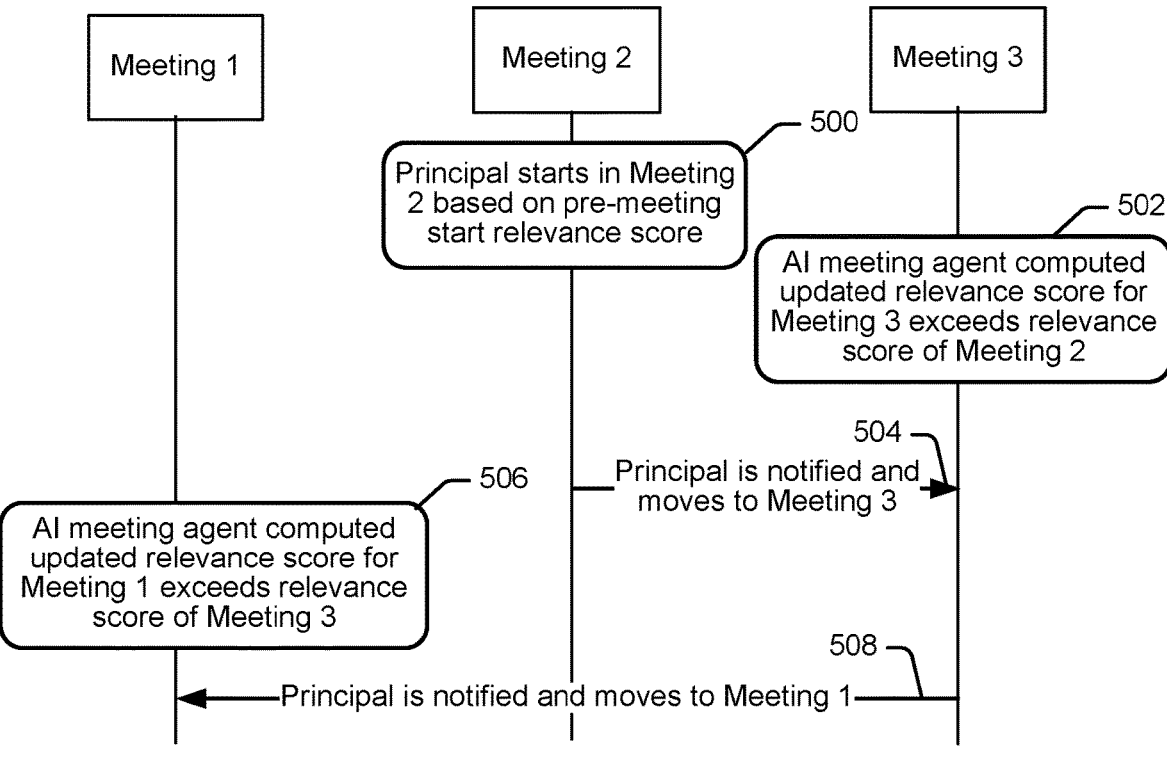
FIG. 5 illustrates operations by the virtual conference meeting server to notify the principal of when the meeting content relevance scores of the monitored meetings trigger the principal's device to be switched between meetings, in the example order of FIG. 4, in accordance with some embodiments of the present disclosure.

FIG. 5 illustrates operations by the virtual conference meeting server to notify the principal of when the meeting content relevance scores of the monitored meetings trigger the principal's device to be switched between meetings, in the example order of FIG. 4, in accordance with some embodiments of the present disclosure.

Referring to FIGS. 4 and 5, the principal starts 500 in Meeting 2 based on the meeting content relevance scores generated before the concurrently scheduled meetings. AI meeting agents 104 monitor Meetings 1 and 3, and possibly also Meeting 2, while the principal is in Meeting 2. The AI meeting agents 104 analyze the content of the media streams of the meetings to generate meeting content relevance scores for each of the meetings. The virtual conference meeting server 100 may operate to respond to a request to join the device 140 of the principal to Meeting 2, by combining the media stream from the device of the principal 140 with the media streams from the Meeting 2 participant devices for distribution among the devices participating in Meeting 2.

At some time in the future, the AI meeting agent monitoring Meeting 3 generates 502 an updated meeting content relevance score for Meeting 3 which is higher than the updated or current meeting content relevance score for Meetings 1 and 2. Therefore, the principal is notified 504 of the suggestion to switch to Meeting 3, and the principal accepts the move and switches streams to Meeting 3. The virtual conference meeting server responding to a request to move the principal from Meeting 2 to Meeting 3, by ceasing the combining of the media stream from the device 140 of the principal into the combined media streams of Meeting 2 with the Meeting 2 participant devices. Also, responsive to the request to move the principal from Meeting 2 to Meeting 3, the operations initiate combining of the media stream from the device 140 of the principal into the combined media streams of Meeting 3 with the Meeting 3 participant devices.

At another future time, the AI meeting agent monitoring Meeting 1 generates 506 an updated meeting content relevance score for Meeting 1 which is higher than the updated or current meeting content relevance score for Meetings 2 and 3. Therefore, the principal is notified 508 of the suggestion to switch to Meeting 1, and the principal accepts the move and switches streams to Meeting 1. The virtual conference meeting server responding to a request to move the principal from Meeting 3 to Meeting 1, by ceasing the combining of the media stream from the device 140 of the principal into the combined media streams of Meeting 3 with the Meeting 3 participant devices. Also, responsive to the request to move the principal from Meeting 3 to Meeting 1, the operations initiate combining of the media stream from the device 140 of the principal into the combined media streams of Meeting 1 with the Meeting 1 participant devices.

Although FIGS. 4 and 5 have been described in the context of being performed in near-real-time during ongoing meetings, various embodiments disclosed herein can be used to determine a proposed time sequence of switches between the scheduled meetings. One or more rules may be used to determine how to split a meeting into smaller time-based sections. For example, when there is a meeting agenda sent via email or meeting invitation with a time section of 10:00-10:20 with presenter: Christian, AI expert, Project: "The Future of AI"; and another time section of 10:20 to 10:40 with presenter: Alice, senior researcher, Project: "The Circular Economy." The virtual conference meeting server 100 can operate to split one meeting into smaller time-based sections according to content of the agenda and generate relevance scores for each section according to the topic, presenters, etc. Another example to split the meeting can include, when a meeting participant sends a message or email to inform that the presenter can only attend the first half of the meeting, the virtual conference meeting server 100 can responsively split the 1 hour meeting into two parts. The virtual conference meeting server 100 can respond to someone indicating they will be late to a meeting or otherwise determining that someone is late to the meeting by responsively splitting the meeting and assigning an AI meeting agent to monitor the meeting during that person's tardy absence.

Figure 8:
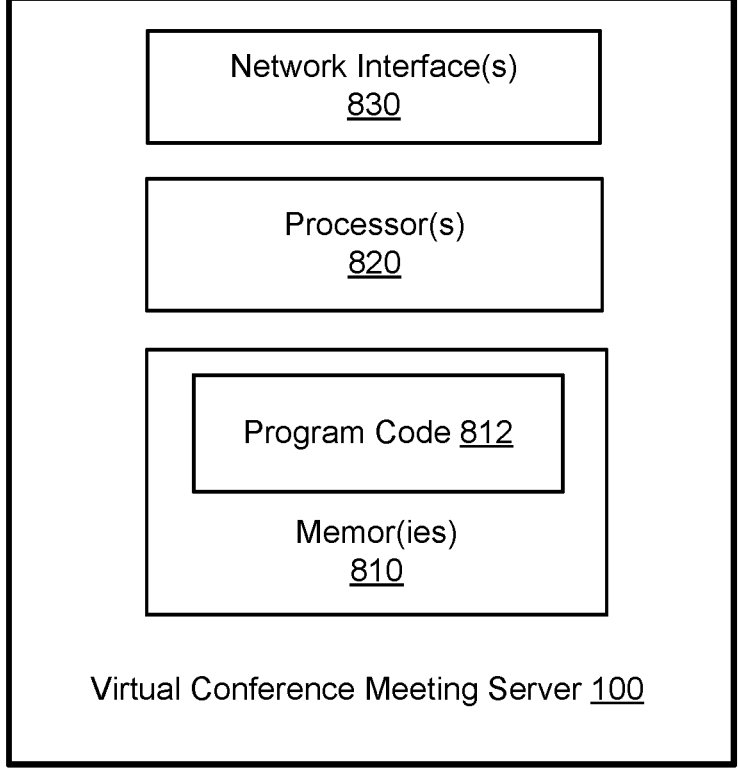
FIG. 8 illustrates components that may be included in the virtual conference meeting server which are configured to operation in accordance with some embodiments of the present disclosure.

FIG. 8 illustrates hardware circuit components that may be included in the virtual conference meeting server 100 of FIG. 1 which are configured to operation in accordance with some embodiments of the present disclosure. Referring to FIG. 8, the virtual conference meeting server 100 can include at least one network interface 830 (network for brevity), at least one processor 820 (processor for brevity), and at least one memory 810 (memory for brevity) storing program code 812. The processor 820 may include one or more data processing circuits, such as a general purpose and/or special purpose processor (e.g., microprocessor and/or digital signal processor) that may be collocated or distributed across one or more networks. The processor 820 is configured to execute the program code 812 to perform operations according to one or more embodiments disclosed herein for a virtual conference meeting server.

Further Definitions and Embodiments

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.,", which derives from the Latin phrase "exempli gratia," may be used to introduce or specify a general example or examples of a previously mentioned item, and is not intended to be limiting of such item. The common abbreviation "i.e.,", which derives from the Latin phrase "id Est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the following examples of embodiments and their equivalents, and shall not be restricted or limited by the foregoing detailed description.

The invention claimed is:

1. A virtual conference meeting server comprising:
at least one processor; and
at least one memory storing program code executable by at least one processor to perform operations comprising:
assign an artificial intelligence (AI) meeting agent to analyze content of a media stream of a monitored meeting;
generate a meeting content relevance score based on the analysis by the AI meeting agent of the content of the media stream of the monitored meeting, wherein the operations to generate the meeting content relevance score based on the analysis by the AI meeting agent of the content of the media stream of the monitored meeting, comprise to identify a level of similarity between the content of the media stream of the monitored meeting and training inputs which were used to train the AI meeting agent;
when the meeting content relevance score satisfies a notification rule, generate a meeting relevance notification to a device of a principal which is not presently joined in to receive the media stream of the monitored meeting;
responsive to an instruction received from the device of the principal or an automated switching rule, switch the device of the principal from another concurrently occurring meeting to join the monitored meeting and receive the media stream of the monitored meeting;
obtain training inputs from a historical repository characterizing previous meetings; and
train a machine learning (ML) model of the AI meeting agent,
wherein the generation of the meeting content relevance score comprises processing the media stream of the monitored meeting through the ML model,
wherein the training inputs obtained from the historical repository comprise at least one of:
content of media streams of previous meetings attended by the principal;
lists of meeting participants of the previous meetings attended by the principal or future meetings scheduled for the principal;
lists of roles of the meeting participants of the previous meetings attended by the principal or the future meetings scheduled for the principal;
content of emails sent by or received by the principal related to the previous meetings attended by the principal or the future meetings scheduled for the principal;
content of group messaging sent by or received by the principal related to the previous meetings attended by the principal or the future meetings scheduled for the principal;
content of files sent by or received by the principal related to the previous meetings attended by the principal or the future meetings scheduled for the principal;
agendas of the previous meetings attended by the principal or the future meetings scheduled for the principal;
whether the previous meetings were recorded;
whether the future meetings scheduled will be recorded;
content of earlier presentations by the principal at the previous meetings attended by the principal;
content of documents accessed by the principal during the previous meetings attended by the principal; or
content of a social media account associated with the principal.

2. The virtual conference meeting server of claim 1, wherein the operations further comprise to:
generate pre-meeting preparation content to include a segment of the content of the media stream for which the meeting content relevance score generated for the segment satisfies a pre-meeting preparation briefing rule;
provide the pre-meeting preparation content to the device of the principal for review before or upon joining the monitored meeting.

3. The virtual conference meeting server of claim 2, wherein the operations to generate the pre-meeting preparation content to include the segment of the content of the media stream for which the meeting content relevance score generated for the segment satisfies the pre-meeting preparation briefing rule, comprise to:

identify a question that is directed to the principal in the segment of the content of the media stream; and generate the pre-meeting preparation content to include the segment of the content of the media stream that contains the question directed to the principal.

4. The virtual conference meeting server of claim 1, wherein the operations to generate the meeting content relevance score based on the analysis by the AI meeting agent of the content of the media stream of the monitored meeting, comprise at least one of:

identify through the analysis of the content of the media stream progress of the monitored meeting relative to a meeting agenda for the monitored meeting; or identify through the analysis of the content of the media stream at least one reference to the principal or an item associated with the principal.

5. The virtual conference meeting server of claim 1, wherein the operations further comprise to:

generate meeting content relevance scores based on processing, through the AI meeting agent, pre-meeting information for scheduled meetings which are candidates for the principal to join and which will at least partially concurrently occur;

generate a proposed time sequence of switches between the scheduled meetings based on ranking of the meeting content relevance scores;

generate a notification to the device of the principal indicating the proposed time sequence of switches between the scheduled meetings; and responsive to a principal accepted time sequence of switches between the scheduled meetings, add the principal accepted time sequence to a meeting scheduling program for the principal.

6. The virtual conference meeting server of claim 5, wherein the pre-meeting information for scheduled meetings comprises at least one of:

agendas for the scheduled meetings;

lists of meeting participants for the scheduled meetings;

lists of roles of the meeting participants for the scheduled meetings;

content of a file that has been shared with the principal related to one of the scheduled meetings;

metadata of the file shared with the principal; or content of a social media account associated with the principal.

7. The virtual conference meeting server of claim 1, wherein the operations further comprise to:

generate new training inputs by the AI meeting agent analyzing the content of the media stream of the monitored meeting, wherein the new training inputs comprise at least one of:

a segment of the content of the media stream of the monitored meeting for which the meeting content relevance score generated for the segment of the content satisfies a training rule;

a list of meeting participants of the monitored meeting when joined by the principal;

a list of roles of the meeting participants of the monitored meeting when joined by the principal;

content of emails sent by or received by the principal related to the monitored meeting;

content of files sent by or received by the principal related to the monitored meeting;

whether the monitored meeting was recorded;

whether instructions were received from the device of the principal to switch the device of the principal from another concurrently occurring meeting to join the monitored meeting after a meeting relevance notification was generated;

an agenda item of the monitored meeting that was discussed while the principal was present in the monitored meeting;

an agenda item of the monitored meeting that was discussed before the principal joined the monitored meeting;

an agenda item of the monitored meeting that was discussed after the principal left the monitored meeting;

content of a presentation of the monitored meeting before the principal joined the monitored meeting;

content of a presentation of the monitored meeting after the principal left the monitored meeting;

content of a presentation by the principal while joined in the monitored meeting;

content of documents accessed by the principal while joined in the monitored meeting; or update the training inputs of the historical repository with the new training inputs.

8. The virtual conference meeting server of claim 1, wherein the operations further comprise to:

generate summary information based on a segment of the content of the media stream for which the meeting content relevance score generated for the segment satisfies a post-meeting summary rule; and provide the generated summary information to the device of the principal.

9. The virtual conference meeting server of claim 1, wherein the operations further comprise to:

assign by an AI manager agent a different instance of a plurality of AI meeting agents to analyze content of a media stream of each of a plurality of scheduled meetings which are candidates for the principal to join and which will at least partially concurrently occur;

for each of the plurality of scheduled meetings, generate the meeting content relevance score based on the analysis by the AI meeting agent of the content of the media stream of the scheduled meeting while occurring;

when the meeting content relevance score satisfies the notification rule, generate a meeting relevance notification to the device of the principal which is not presently joined in to receive the media stream of the scheduled meeting; and responsive to an instruction received from the device of the principal or the automated switching rule, switch the device of the principal to join the scheduled meeting and receive the media stream of the scheduled meeting.

10. The virtual conference meeting server of claim 9, wherein the notification rule comprises:

identifying when the meeting content relevance score for one of the scheduled meetings exceeds another meeting content relevance score for another one of the scheduled meetings to which the device of the principal is currently joined.

11. A method by a virtual conference meeting server, the method comprising:

assigning an artificial intelligence (AI) meeting agent to analyze content of a media stream of a monitored meeting;

generating a meeting content relevance score based on the analysis by the AI meeting agent of the content of the media stream of the monitored meeting, wherein generating the meeting content relevance score based on the analysis by the AI meeting agent of the content of the media stream of the monitored meeting comprises identifying a level of similarity between the content of the media stream of the monitored meeting and training inputs which were used to train the AI meeting agent;

when the meeting content relevance score satisfies a notification rule, generating a meeting relevance notification to a device of a principal which is not presently joined in to receive the media stream of the monitored meeting;

responsive to an instruction received from the device of the principal or an automated switching rule, switching the device of the principal from another concurrently occurring meeting to join the monitored meeting and receive the media stream of the monitored meeting;

obtaining training inputs from a historical repository characterizing previous meetings; and training a machine learning (ML) model of the AI meeting agent, wherein the generation of the meeting content relevance score comprises processing the media stream of the monitored meeting through the ML model, wherein the training inputs obtained from the historical repository comprise at least one of:

content of media streams of previous meetings attended by the principal;

lists of meeting participants of the previous meetings attended by the principal or future meetings scheduled for the principal;

lists of roles of the meeting participants of the previous meetings attended by the principal or the future meetings scheduled for the principal;

content of emails sent by or received by the principal related to the previous meetings attended by the principal or the future meetings scheduled for the principal;

content of group messaging sent by or received by the principal related to the previous meetings attended by the principal or the future meetings scheduled for the principal;

content of files sent by or received by the principal related to the previous meetings attended by the principal or the future meetings scheduled for the principal;

agendas of the previous meetings attended by the principal or the future meetings scheduled for the principal;

whether the previous meetings were recorded;

whether the future meetings scheduled will be recorded;

content of earlier presentations by the principal at the previous meetings attended by the principal;

content of documents accessed by the principal during the previous meetings attended by the principal; or content of a social media account associated with the principal.

12. The method of claim 11, further comprising:

generating pre-meeting preparation content to include a segment of the content of the media stream for which the meeting content relevance score generated for the segment satisfies a pre-meeting preparation briefing rule;

providing the pre-meeting preparation content to the device of the principal for review before or upon joining the monitored meeting.

13. The method of claim 12, wherein generating the pre-meeting preparation content to include the segment of the content of the media stream for which the meeting content relevance score generated for the segment satisfies the pre-meeting preparation briefing rule, comprises:

identifying a question that is directed to the principal in the segment of the content of the media stream; and generating the pre-meeting preparation content to include the segment of the content of the media stream that contains the question directed to the principal.

14. The method of claim 11, wherein generating the meeting content relevance score based on the analysis by the AI meeting agent of the content of the media stream of the monitored meeting, comprises at least one of:

identifying through the analysis of the content of the media stream progress of the monitored meeting relative to a meeting agenda for the monitored meeting; or identifying through the analysis of the content of the media stream at least one reference to the principal or an item associated with the principal.

15. The method of claim 11, further comprising:

generating meeting content relevance scores based on processing, through the AI meeting agent, pre-meeting information for scheduled meetings which are candidates for the principal to join and which will at least partially concurrently occur;

generating a proposed time sequence of switches between the scheduled meetings based on ranking of the meeting content relevance scores;

generating a notification to the device of the principal indicating the proposed time sequence of switches between the scheduled meetings; and responsive to a principal accepted time sequence of switches between the scheduled meetings, adding the principal accepted time sequence to a meeting scheduling program for the principal.

16. The method of claim 15, further comprising:

controlling switching of the device of the principal between the scheduled meetings, based on the principal accepted time sequence of switches between the scheduled meetings.

17. The method of claim 11, further comprising:

generating new training inputs by the AI meeting agent analyzing the content of the media stream of the monitored meeting, wherein the new training inputs comprise at least one of:

a segment of the content of the media stream of the monitored meeting for which the meeting content relevance score generated for the segment of the content satisfies a training rule;

a list of meeting participants of the monitored meeting when joined by the principal;

a list of roles of the meeting participants of the monitored meeting when joined by the principal;

content of emails sent by or received by the principal related to the monitored meeting;

content of files sent by or received by the principal related to the monitored meeting;

whether the monitored meeting was recorded;

whether instructions were received from the device of the principal to switch the device of the principal from another concurrently occurring meeting to join the monitored meeting after a meeting relevance notification was generated;

an agenda item of the monitored meeting that was discussed while the principal was present in the monitored meeting;

an agenda item of the monitored meeting that was discussed before the principal joined the monitored meeting;

an agenda item of the monitored meeting that was discussed after the principal left the monitored meeting;

content of a presentation of the monitored meeting before the principal joined the monitored meeting;

content of a presentation of the monitored meeting after the principal left the monitored meeting;

content of a presentation of the monitored meeting while the principal is present in the monitored meeting;

content of a presentation by the principal while joined in the monitored meeting;

content of documents accessed by the principal while joined in the monitored meeting; or updating the training inputs of the historical repository with the new training inputs.

* * * * *